May 3, 1949.                 C. R. GILBERTSON                 2,468,970
                              GEAR OR WHEEL PULLER
                              Filed July 11, 1945
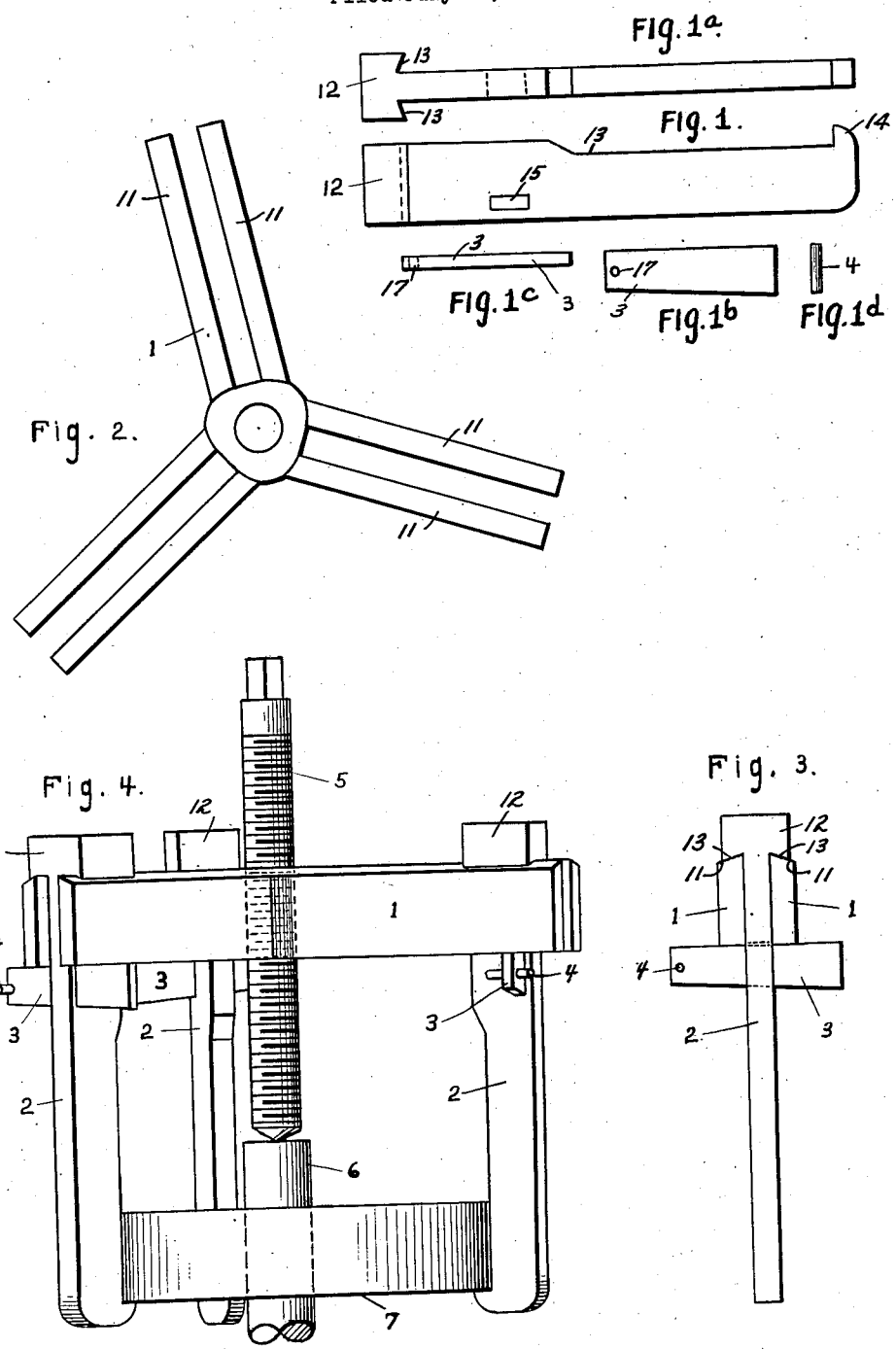
Inventor
Clarence R. Gilbertson Patented May 3, 1949

2,468,970

UNITED STATES PATENT OFFICE 2,468,970

GEAR OR WHEEL PULLER

Clarence R. Gilbertson, Spokane, Wash.

Application July 11, 1945, Serial No. 604,443

1 Claim. (Cl. 29—259)

The invention relates to an arrangement of jaws which fasten securely to a gear or wheel to operate in conjunction with a screw to provide pressure against a shaft to draw the gear or wheel from the shaft.

One form of the invention is illustrated in the accompanying drawing, wherein

Fig. 1 is a front elevation of one of the gripping jaws in accordance with the present invention;

Fig. 1a is a plan view of Fig. 1;

Fig. 1b is a plan view of the wedging element forming a part of the gripping jaw;

Fig. 1c is a plan view of Fig. 1b;

Fig. 1d is a front elevation of the pin forming part of the wedging element to maintain the assembly in an integrated condition;

Fig. 2 is a plan view of the frame of the device embodying a plurality of radial bifurcated arms with each of which cooperates one of the jaws shown in Fig. 1;

Fig. 3 is an end view of one of the arms of the frame shown in Fig. 2, showing the cooperation of the parts; and Fig. 4 is a front elevation of the apparatus with the parts in working position for the removal of a gear or wheel from a shaft on which the same is mounted.

Figure 1 shows front view of gripping jaw 2 with broad head or shoulders 12 with sloping surfaces 13 which correspond to sloping surfaces 11 on the top of the spaced elongated supporting arms 1 on each side of the centrally disposed slot therebetween forming a bifurcated support for the gripping jaw. The gripping jaw extends from the head 12 to an elongated shank and terminates in a hook 14. An opening 15 entirely within the lateral boundary of the shank is designed to accommodate a wedge 3 for transverse movement relative to the gripping jaw. Wedge 3 has ends of unequal length with the edge adjacent to the arms normal thereto and the opposite edge disposed along an inclined plane for cooperation with the end of opening 15 which is remote from arms 1. Pin 4 is fastened in the opening 17 of wedge 3 to limit the movement of the wedge within the opening 15 when the smaller end of the wedge is struck to loosen jaw 2 so that it may be moved horizontally along bifurcated or slotted arms 1 to accommodate gear or wheel 7 of varying diameters; when jaw 2 has been placed to desired position, wedge 3 can be forced to place to hold jaw 2 in position; this pressure also assures parts of arm 1 to fit closely to jaw 2 by its effect on upper sloping surfaces of arm 1 which causes the forked parts of the assembly 1 to press towards each other against the upper end of the jaw therebetween. This process applies to the three jaws 2 on the three arms 1.

Fig. 3 shows jaw 2 placed between the bifurcated parts of arm 1 with wedge 3 in place through aperture 15 in jaw 2 and with pin 4 engaged in opening 17 in the wedging element 3 to provide an integrated assembly wherein the jaw 2 may be moved along the arms 1 to any desired position.

Figure 4 shows the invention in position to function. Shaft 6 and gear or wheel 7 are not parts of the invention but are included in the drawing to illustrate the function of the invention. The manner of employing the invention is as follows: Screw 5 is moved in an upward direction to allow placement of the invention over gear or wheel 7. Each jaw 2 is moved horizontally on arm 1 until the jaws 2 fit securely against gear or wheel 7 whereupon the wedges 3 are moved transversely through the openings 15 and are thus forced into place to tighten the jaws 2 against the arms 1. Screw 5 is then turned down to contact shaft 6. The invention is then in position to function. Additional turning of screw 5 draws gear or wheel 7 from shaft 6.

I am aware that gear or wheel pullers using a screw and jaws have been made. But I claim two peculiar and unique advantages for my invention which are as follows:

(a) Formation of wedge 3 permits it to be loosened to allow the ready adjustment of the invention to gears or wheels of varying sizes and easily tightened to fix jaw 2 securely in place so that it does not move during the operation of the invention.

(b) The cut out section of jaw 2 as shown in the lateral view of Figure 1 causes the effective pull to be placed in the center of the head of jaw 2 so that jaw 2 shows no tendency to slip from gear or wheel 7. The result of this arrangement is a tighter grip as the pull caused by turning screw 5 increases.

I claim:

A puller element embodying a bifurcated support having a pair of spaced elongated supporting arms providing a centrally disposed slot, a gripping jaw having a head at one end overlying said arms, an elongated shank integral with and extending from said head through said slot and terminating in a hook, and a single elongated opening entirely within the lateral boundary of said shank underlying said arms, and a wedging element movable in said slot transversely of the plane of movement of said jaw and operable to clamp said arms between said wedge and head to afford a rapid engagement and disengagement between said head and arms for adjustably fixing said jaw along any point on said arms, said wedging element having ends of unequal length with the edge adjacent to the arms normal thereto and the opposite edge disposed along an inclined plane for cooperation with the end of said elongated opening remote from said arms, to effect a camming action on said jaw to clamp said arms at any radial point therealong by a single blow of said wedging element on its larger end, which may be quickly released by a single blow on said smaller end of said wedging element.

CLARENCE R. GILBERTSON.

REFERENCES CITED

The following references are of record in the file of this patent:

UNITED STATES PATENTS

| Number | Name | Date |
|---|---|---|
| 1,308,084 | Lampert | July 1, 1919 |
| 1,478,648 | Grahek | Dec. 25, 1923 |
| 1,584,855 | Eisenhuth | May 18, 1926 |
| 1,607,592 | Marciano | Nov. 16, 1926 |

FOREIGN PATENTS

| Number | Country | Date |
|---|---|---|
| 57,590 | Switzerland | Oct. 31, 1911 |